March 22, 1966 E. MORRIS 3,241,450
CONVERSION APPARATUS
Filed March 6, 1964 3 Sheets-Sheet 1
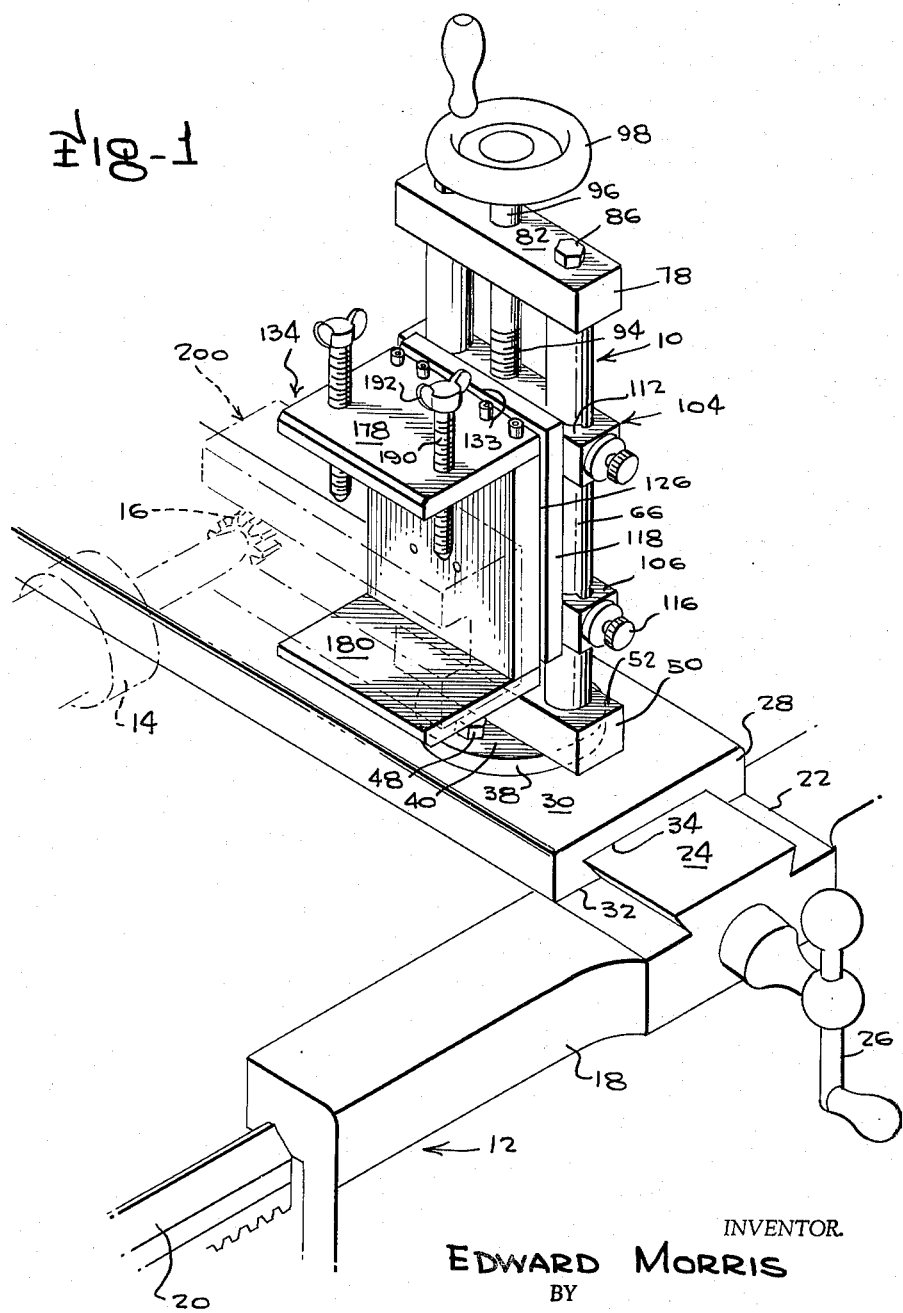
INVENTOR.
EDWARD MORRIS
BY
McMorrow, Berman & Davidson
ATTORNEYS

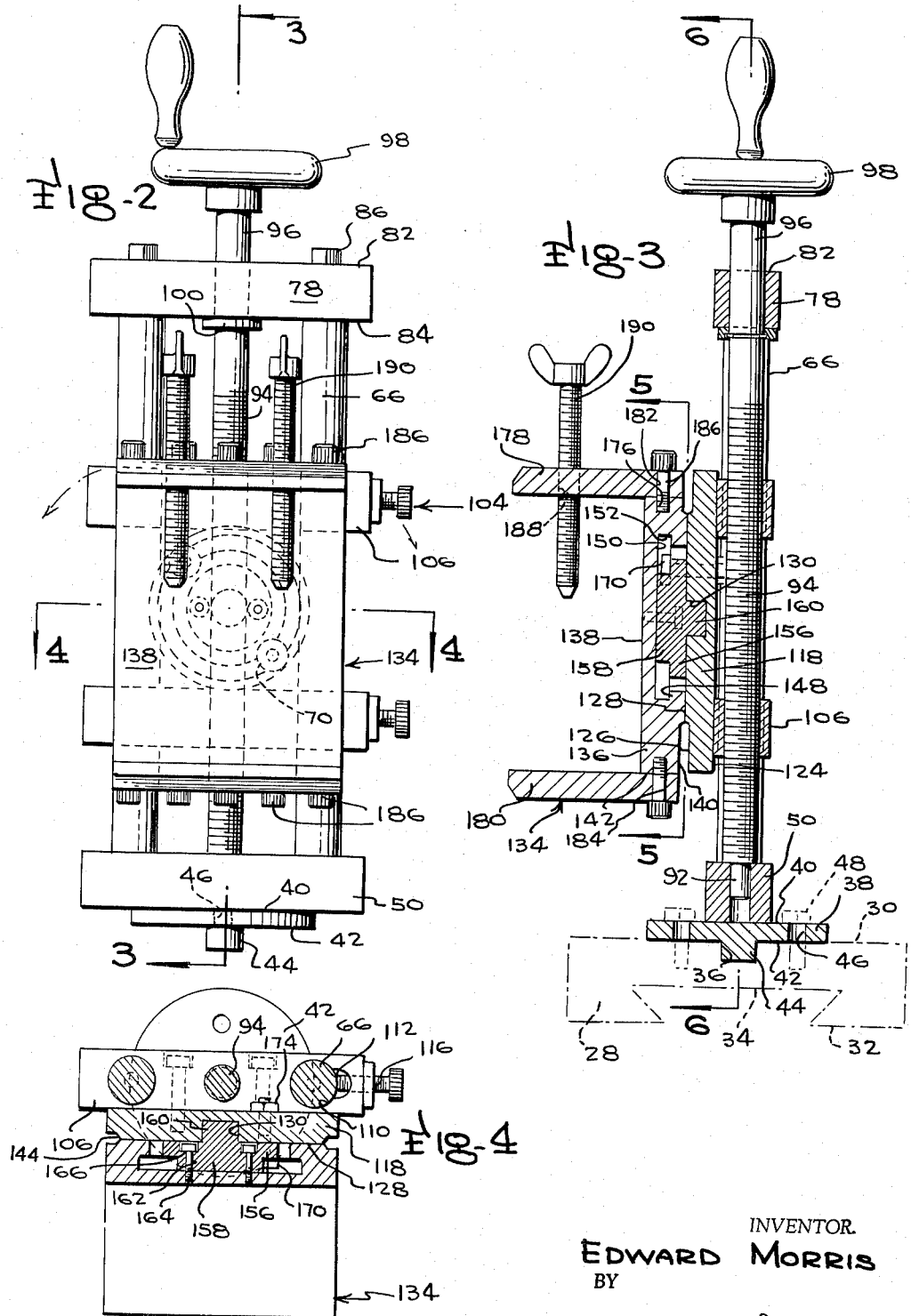

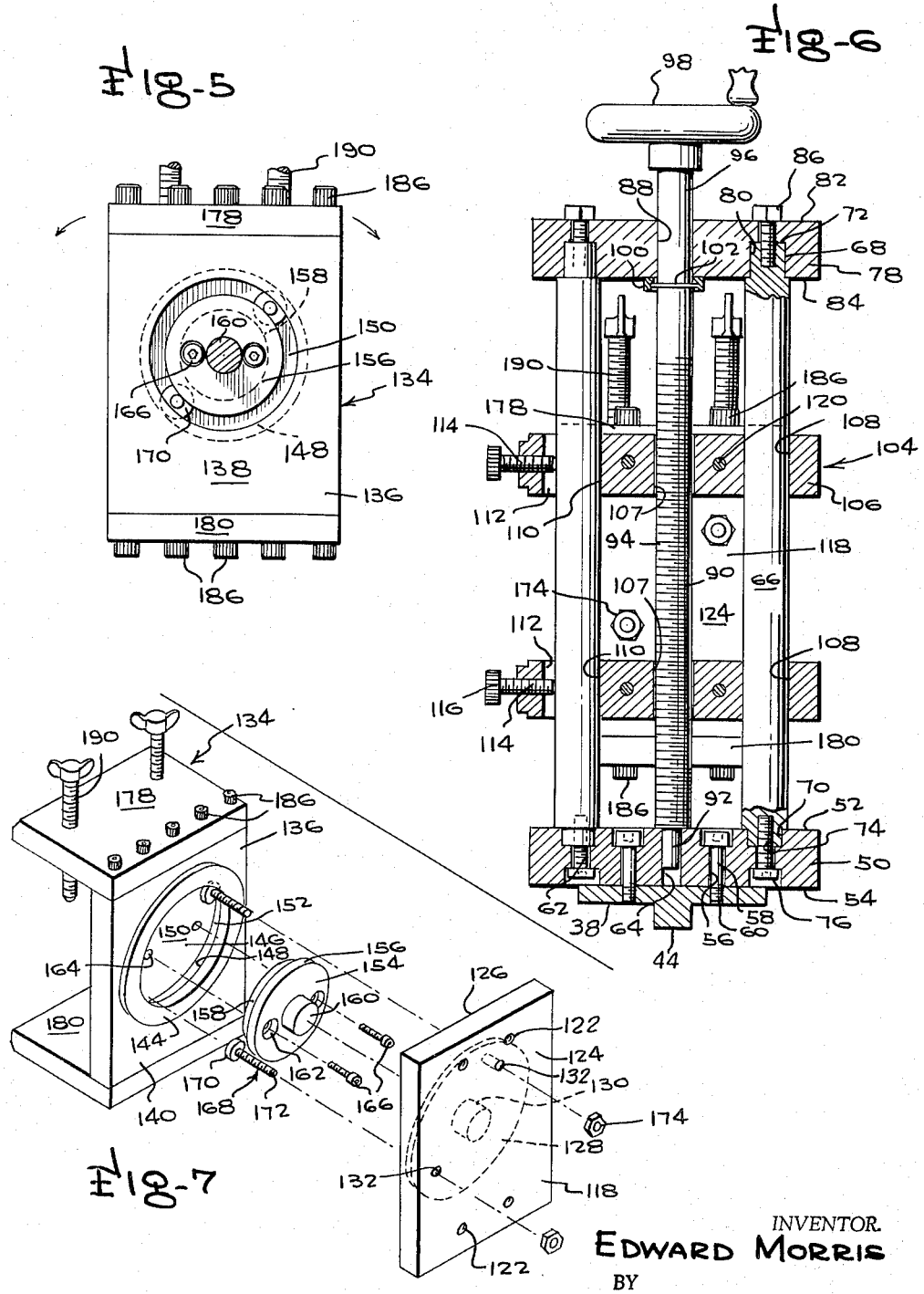

United States Patent Office 3,241,450
Patented Mar. 22, 1966

**3,241,450
CONVERSION APPARATUS**
Edward Morris, 5156 Southview Drive,
Fairfield, Ohio
Filed Mar. 6, 1964, Ser. No. 350,017
2 Claims. (Cl. 90—11)

This invention relates to conversion apparatus in general, and more specifically, to apparatus for use with a tool driving machine, such as a standard lathe or the like, to convert the machine for performance of an expanded range of operations.

An object of this invention is to provide a movable work holder for use in the conversion of standard tool driving machinery for expansion of the available functions thereof, the holder being adjustable to a maximum range of positions. A related object is to supply a novel swivel assembly whereby certain of the holder elements are adjustable to any desired relative angularity.

In the construction of standard machinery for driving tool elements, such as lathes, presses, and the like, it is customary to provide a tool or work holding and rotating chuck means and a tool or work holding clamp assembly, the chuck means and clamp assembly being relatively movable. Apparatus of the present invention provides a universally adjustable holding means which is adapted to be readily substituted for the existing tool or work elements.

Another object is to provide a work holding attachment particularly adapted for use with a standard engine lathe to convert the lathe for milling, shaping, drilling, and surfacing work, the holder being attachable to a compound holder assembly conventionally supplied with such lathe and providing operation of the foregoing functions at a maximum range of angularity.

Still another object is to provide a conversion apparatus as indicated above which is of relatively non-complex construction and assembly, inexpensive and simple to manufacture and sell, and durable in use.

Other and further objects and advantages of the invention will become apparent to those skilled in the art from a consideration of the following specification when read in conjunction with the annexed drawings, in which:

FIGURE 1 is a perspective view showing a portion of a representative standard engine lathe, with a conversion attachment constructed and assembled in accordance with the teachings of this invention in place thereon;

FIGURE 2 is an enlarged front elevational view of the attachment;

FIGURE 3 is a vertical cross sectional view, taken substantially on section line 3—3 of FIGURE 2, looking in the direction of the arrows;

FIGURE 4 is a detail, transverse cross sectional view, taken substantially on the section line 4—4 of FIGURE 2, looking in the direction of the arrows;

FIGURE 5 is a sectional view, showing details, along the line 5—5 of FIGURE 3, looking in the direction of the arrows;

FIGURE 6 is a sectional view along the line 6—6 of FIGURE 3, looking in the direction of the arrows; and FIGURE 7 is a disassembled perspective view of a portion of the apparatus hereof, further showing the details of the swivel means provided herein.

In FIGURE 1, the conversion apparatus 10 of the present invention is shown as applied to a representative tool driving machine 12 such as a lathe. The lathe 12 includes a chuck 14 driving a cutting tool 16, and a longitudinally movable slide assembly 18 is mounted on the lathe bed 20 below the tool. The slide assembly 18 includes a transversely extending mount 22, with a dovetail projection 24 and actuating handle means 26.

The device 10 of the present invention, which as may be readily seen is easily adapted for use with a wide variety of machinery of which the lathe 12 is only one example, comprises an elongated, substantially rectangular movable supporting base 28 having an upper side 30 and a lower side 32 with a dovetail groove 34 therein whereby it is mounted for transverse movement on the mount 22 in the usual manner. As seen in FIGURE 3, the supporting base 28 has an opening 36 formed therein opening on its side 32, providing a vertically disposed mounting well.

A substantially discoidal plate 38 having an upper side 40 and lower side 42 is provided, and a substantially cylindrical stub axle 44 projects from the side 42 and is tightly received in the well 36. The plate 38 has vertical openings 46 therein which receive bolt means 48 extended into the base 28 to fixedly secure the plate 38 thereto. A first, lower, generally rectangular block member 50 having upper and lower sides 52 and 54 is provided, see FIGURE 6. The block 50 has plural, countersunk bores 56 formed therein, and as seen in FIGURE 6, bolt means 58 are extended therethrough for connection in coaligned openings 60 in the plate 38, thereby securing the block to the plate. On opposite sides of the bores 56, the block has compound openings 62 formed therein for a purpose more fully described below, and a central bore 64 is also provided and extends vertically through the block.

The apparatus 10 further includes a pair of substantially cylindrical guide rods 66 having reduced upper and lower ends 68, 70 with inward threaded bores 72 and 74 formed therein. As seen in FIGURE 6, the ends 70 are extended into corresponding upper portions of the compound openings 62 and screw means 76 are extended into the bores 74, whereby the ends 70 of the rods 66 are fixed to the block 50 adjacent its ends.

An upper block 78 is provided and has compound bores 80 therein extending from its upper side 82 to its lower side 84, said bores being aligned with the compound bores 62 of the block 50. Referring again to FIGURE 6, as shown therein, the upper ends 68 of guide rods 66 are mounted in the enlarged lower portions of the bores 80, and screw means 86 are extended into the bore upper portions and into the openings 72. The block 78 has a generally centrally located, vertical bore 88 therein in vertical alignment with the bore 64 of the lower block 50, the bore 88 being of enlarged diameter relative to the bore 64. An operating spindle or actuating rod 90 is provided and has a reduced diameter lower end 92 rotatably mounted in the bore 64, a threaded central section 94 and a smooth upper section 96 extended through the bore 88. An operating handle means 98 is connected to the end 96 outwardly of the block outer side 82, and a bearing assembly 100 is secured to the side 84 about a ring 102 of the spindle 90.

Vertically movable slide frame means 104, comprising generally identical upper and lower cross arms 106, is supplied for the vertical adjustment of the work holding means. Each cross arm is of substantially rectangular form and has vertical passageways 108 and 110 formed therein slidably receiving the guide rods 66, there being an enlargement 112 at one side of the passageways 110. Threaded, longitudinal openings 114 are extended outwardly from the enlargements 112 to the outer end of the cross arms and headed screws 116 are engaged in each opening 114 providing thereby a means for locking the frame members 104 at any selected height on the rods 66. To this end the cross arms 106 are each provided with vertically-extending threaded openings 107 intermediate their respective ends to receive therethrough the threaded central section 94 of the spindle 90 whereby the cross arms 106 may be vertically-adjusted simultaneously. The frame means 104 further includes a back plate 118 of generally rectangular shape which connects the cross arms 106 and which is secured thereto by screw means 120 extending into openings 122 (FIGURE 7). The back plate 118 has an inner side 124 and an outer side 126, and side 126 has a central, outwardly extended cylindrical bearing surface portion 128 with a central socket 130 formed therein. As best seen in FIGURE 7, transverse openings 132 extend through the full width of the back plate 118 on diametrically opposite sides of the socket 130, for a purpose described below. Indicia means 133 is supplied adjacent an upper edge of the plate as seen in FIGURE 1.

Mounted for rotational movement to any selected location about a full 360° path on the plate 118 is a work clamp or engagement bracket assembly 134. The bracket assembly is of generally U-shaped configuration, and has a substantially rectangular bight portion 136 with an outer side 138 and inner side 140 and end edges 142. The inner side 140 has an annular central boss 144 projecting outwardly therefrom which, as seen in FIGURE 3, is of substantially the same diameter as the portion 128 of the plate 118, and the boss bears against such portion. An inward depression 146 is formed in the bight 136 and opens on the side 140 thereof, the depression being of a diameter greater than that of the boss 144, and the boss forming an inward shoulder at 148 and having a portion thereof overhanging the depression 146. The depression further includes a base wall 150 and annular side wall 152. From the foregoing description it is seen that the outer marginal peripheral edge of the base wall 150, the overhanging portion of the shoulder 148 and the annular sidewall 152 form a track. A roller member 154 including a substantially disc-shaped main body portion 156, a reduced forward portion 158, and a reduced, substantially cylindrical projection 160 is provided, and projection 160 is seated in the socket 130 (FIGURES 3 and 4). The roller has openings 162 therein aligned with openings 164 formed in the wall 150, and screw means 166 extend through the openings 162 into threaded engagement within the openings 164, thus fixedly securing the roller member 154 to the bight portion 136.

For selective positioning of the clamp assembly 134 relative to the plate 118, and to serve as a bearing means in the rotation thereof, there are supplied a pair of bearing screws 168 having enlarged, generally discoidal bearing heads 170, and threaded shanks 172. As seen in the drawings, the heads are engaged between the shoulder 148 and the wall 150 of the depression 146 riding against the side wall 152 and being clamped therein by the main body portion 156 of the roller members. The shanks 172 extend through the openings 132 of the back plate 118 and are engaged with nuts 174 which are readily accessible for loosening and tightening as seen in FIGURE 6.

The end edges 142 of the bight 136 have spaced apart, threaded openings 176 formed therein, and the clamp assembly 134 further includes opposing side arms or jaws 178 and 180 with openings 182, 184 aligned with the openings 176. The jaws 178, 180 are held in place on the bight by screw means 186 to provide the generally U-shaped assembly shown. Arm 178 has openings 188 therein with screws 190 mounted for inward and outward clamping movement. As shown in FIGURE 1, work piece 200 is clamped between the jaw 180 and the screws 190. An indicia 192 is provided which, with the indicia means 133 indicates upright alignment of the clamp assembly with respect to the plate.

As will readily appear from the foregoing, the apparatus 10 is capable of positioning the work piece 200 at a maximum variety of operating positions with respect to the tool 16.

Having described and illustrated a specific embodiment of this invention in some detail, it will be understood that this description and illustration are offered merely by way of example, and that the invention is to be limited in scope only by the appended claims.

What is claimed is:

1. In combination with a tool-driving machine having a bed assembly, a driven tool element operatively-positioned adjacent the bed assembly, and a slide mechanism slidably-mounted on said bed assembly, a work-holding attachment comprising an elongated supporting base slidably-mounted on said slide mechanism for movement in a direction perpendicular to the direction of movement of said slide mechanism, an elongated substantially rectangular lower block fixedly-secured to said supporting base with its elongation extending substantially parallel to the slidable movement of said supporting base, a pair of vertically-extending substantially parallel guide rods having a first pair of adjacent ends secured, respectively, to the remotely-disposed ends of said supporting base, said guide rods projecting upwardly away from said supporting base and terminating in a second pair of adjacent ends, an elongated substantially rectangular upper block, means fixedly-securing the remotely-disposed end of said upper block to the upper terminal ends of said guide rods, said lower and upper blocks each having openings formed therein extending transversely therethrough in confronting aligned relationship relative to one another, said aligned openings being disposed intermediate the remotely-disposed ends of their respective associated block, an upright cylindrical shaft having its opposed ends journaled, respectively, for rotation in said pair of aligned openings and extending substantially parallel to said guide rods and having a centrally-threaded portion, a pair of elongated substantially rectangular identically-constructed cross arms, each of said cross arms having an opening extending transversely therethrough adjacent their respective remotely-disposed ends, said cross arms being substantially parallel to one another in vertically-spaced relation with their said openings at each adjacent pair of ends of said cross arms being coaxially-aligned to slidably-receive therethrough one of said guide rods, each of said cross-arms having an internally-threaded vertically-extending opening extending transversely therethrough intermediate the openings adjacent said ends thereof, said internally-threaded openings being aligned with one another and receiving said central portion of said shaft therein whereby rotation of said shaft effects vertical movement of said cross arms, a substantially upright back plate fixedly-secured to said cross arms and having an outwardly-facing side, said cross arms and said back plate being slidable to adjusted positions on said guide rods, means securing said cross arms and said back plate in adjusted position relative to said guide rod, a substantially U-shaped work clamp including a bight portion from each opposed end of which laterally projects, respectively, a side arm, said side arms being disposed in spaced and parallel relationship relative to one another, said bight portion having opposed parallel inner and outer sides, said outer side facing in the direction of the extension of said arms, said bight portion having a centrally-located annular boss projecting laterally from its said inner side and slidably-engaging said outwardly-facing side of said back plate, said boss having a portion thereof overhanging said inner side of said bight portion, said inner side of said bight portion, said boss and its said overhanging portion forming a track, means slidably-received within said track and releasably-secured on said back wall to support said work clamp for rotation thereon, and means extending transversely through one of said side arms to releasably-clamp a workpiece against the other one thereof.

2. In combination with a tool-driving machine having a bed assembly, a driven tool element operatively-positioned adjacent the bed assembly, and a slide mechanism slidably-mounted on said bed assembly, a work-holding attachment comprising an elongated supporting base slidably-mounted on said slide mechanism for movement in a direction perpendicular to the direction of movement of said slide mechanism, an elongated substantially rectangular lower block fixedly-secured to said supporting base with its elongation extending substantially parallel to the slidable movement of said supporting base, a pair of vertically-extending substantially parallel guide rods having a first pair of adjacent ends secured, respectively, to the remotely-disposed ends of said supporting base, said guide rods projecting upwardly away from said supporting base and terminating in a second pair of adjacent ends, an elongated substantially rectangular upper block, means fixedly-securing the remotely-disposed end of said upper block to the upper terminal ends of said guide rods, said lower and upper blocks each having openings formed therein extending transversely therethrough in confronting aligned relationship relative to one another, said aligned openings being disposed intermediate the remotely-disposed ends of their respective associated block, an upright cylindrical shaft having its opposed ends journaled, respectively, for rotation in said pair of aligned openings and extending substantially parallel to said guide rods and having a centrally-threaded portion, a pair of elongated substantially rectangular identically-constructed cross arms, each of said cross arms having an opening extending transversely therethrough adjacent their respective remotely-disposed ends, said cross arms being substantially parallel to one another in vertically-spaced relation with their said openings at each adjacent pair of ends of said cross arms being coaxially-aligned to slidably-receive therethrough one of said guide rods, each of said cross-arms having an internally-threaded vertically-extending opening extending transversely therethrough intermediate the openings adjacent said ends thereof, said internally-threaded openings being aligned with one another and receiving said central portion of said shaft therein whereby rotation of said shaft effects vertical movement of said cross-arms, a substantially upright back plate fixedly-secured to said cross arms and having an outwardly-facing side, said cross arms and said back plate being slidable to adjusted positions on said guide rods, means securing said cross arms and said back plate in adjusted position relative to said guide rod, a substantially U-shaped work clamp including a bight portion from each opposed end of which laterally projects, respectively, a side arm, said side arms being disposed in spaced and parallel relationship relative to one another, said bight portion having opposed parallel inner and outer sides, said outer side facing in the direction of the extension of said arms, said bight portion having a centrally-located annular boss projecting laterally from its said inner side and slidably-engaging said outwardly-facing side of said back plate, said boss having a portion thereof overhanging said inner side of said bight portion, said inner side of said bight portion, said boss and its said overhanging portion forming a track, a pair of headed screws, said screws having a portion of their respective heads disposed within said track and being slidably-received therein with the shanks thereof projecting away therefrom and extending through said back plate to support said work clamp for rotation thereon, a nut for each of said screws to tighten said work clamp against said back plate to secure said work clamp in its adjusted position relative to said back plate, a substantially cylindrical roller member having a disc-shaped main body portion and a forwardly-extending portion of reduced diameter, said roller member reduced portion being embraced by said track and being disposed between said screws with said main body portion overhanging the remaining portions of said heads, means fixedly-securing said roller member to said bight portion, and means extending transversely through one of said side arms to releasably-clamp the workpiece against the other of said side arms.

References Cited by the Examiner

UNITED STATES PATENTS

| | | |
|---|---|---|
| 1,024,254 | 4/1912 | Garrett. |
| 1,167,612 | 1/1916 | Anderson et al. |
| 1,576,719 | 3/1926 | Chaplin. |
| 2,074,844 | 3/1937 | Hill. |
| 2,203,162 | 6/1940 | Lee. |
| 2,608,909 | 9/1952 | Quinn. |

WILLIAM W. DYER, JR., *Primary Examiner.*

L. VLACHOS, *Assistant Examiner.*